United States Patent [19]

Aglàe et al.

[11] 4,441,672

[45] Apr. 10, 1984

[54] RETRACTILE SUPPORT UNIT FOR AN ARRESTING CABLE DISPOSED ACROSS A TAKE-OFF OR LANDING STRIP FOR AIRCRAFT

[75] Inventors: Gilbert R. Aglàe, Orsay; Jacques J. Alavoine, Neauphle le Chateau; Claude Contensou, Paris; Jacques R. Rousseau, Epinay sur Orge; Célestin Cérati, Longjumeau, all of France

[73] Assignee: Aerazur EFA, France

[21] Appl. No.: 410,097

[22] Filed: Aug. 20, 1982

Related U.S. Application Data

[63] Continuation-in-part of Ser. No. 176,430, Aug. 8, 1980, abandoned.

[30] Foreign Application Priority Data

Aug. 10, 1979 [FR] France .............................. 79 20491

[51] Int. Cl.³ .............................................. B64F 1/02
[52] U.S. Cl. .................................................. 244/110 C
[58] Field of Search ............... 244/110; 74/110, 99 A, 74/567, 569

[56] References Cited

U.S. PATENT DOCUMENTS

| 146,161 | 1/1874 | Beach | 74/569 |
|---|---|---|---|
| 2,648,351 | 8/1953 | Curtis et al. | 74/110 |
| 2,919,871 | 1/1960 | Sorenson | 244/110 C |
| 3,044,292 | 7/1962 | Matthews | 74/110 |
| 3,115,785 | 12/1963 | Simmons | 74/569 |
| 3,410,509 | 11/1968 | Carr | 244/110 C |
| 3,428,275 | 2/1969 | Condodina et al. | 244/110 C |
| 3,543,903 | 12/1970 | Lodige | 74/110 |
| 3,670,997 | 6/1972 | Fonde et al. | 244/110 C |
| 3,726,498 | 4/1973 | Schegel | 244/110 C |

FOREIGN PATENT DOCUMENTS 24244 2/1981 European Pat. Off. ........ 244/110 C

Primary Examiner—Galen L. Barefoot
Attorney, Agent, or Firm—William A. Drucker

[57] ABSTRACT

Actuators transversally movable through a reciprocable mechanical connection, under the control of a single unit disposed at one side of the strip are housed within a channel provided across the strip. Each actuator comprises a cam having an inclined plane and a cable support constantly engaging the inclined plane and adapted to pivot about an axis parallel to the cable axis, so that the raising of the cable support causes the cable to be raised while being off set in relation to its retraction channel.

4 Claims, 6 Drawing Figures

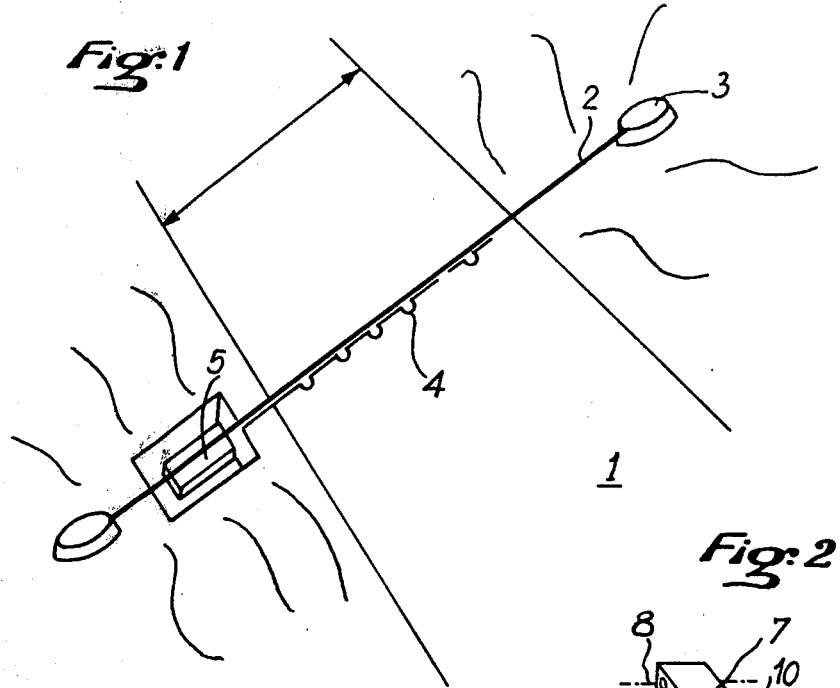
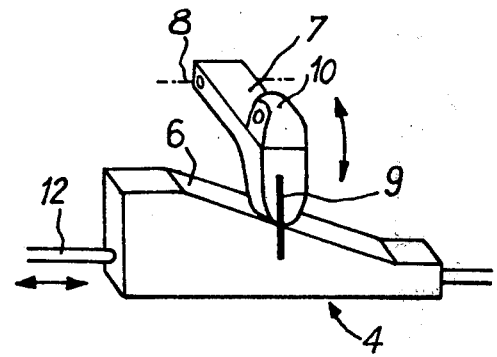
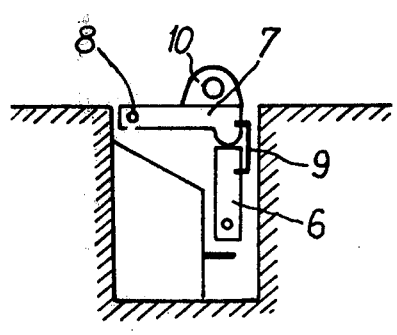
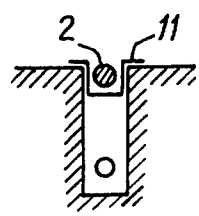
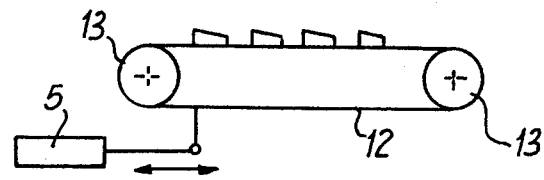

RETRACTILE SUPPORT UNIT FOR AN ARRESTING CABLE DISPOSED ACROSS A TAKE-OFF OR LANDING STRIP FOR AIRCRAFT

The present application is a continuation-in-part of our co-pending application Ser. No. 176 430 filed on Aug. 8, 1980, now abandoned.

BACKGROUND OF THE INVENTION

1. Field of the Invention

This invention concerns improvements relating to the operation of systems for raising and setting back aircraft arresting gears.

At present, on take-off and landing strips or runways, these arresting gears commonly have a net adapted to be raised in front of the aircraft in case of emergency, or alternatively a cable or wire extending across the strip in the case of aircraft equipped with a special crosshead.

It is the object of the present invention to widen the field of possible use of a rectractible bracket system for a crossing cable.

2. Description of the Prior Art

The most popular systems employed for this purpose involve pulling back the cable into a channel provided in the runway, so that the cable does not constitute an obstacle when aircrafts are passing and may be restored to its raised position for being caught, in case of emergency, by the cross-head of an aircraft.

The pulling back of the cable is obtained by disposing within the runway a plurality of rams (about 15 to 20 according to the runway width) which are individually fed with compressed gas from tanks disposed at one side of the runway.

Moreover, as the cable raising takes place, a linkage system causes the cable supports to move laterally for preventing the cable staying vertically above its housing in the runway so as to avoid inadvertent pulling back of the cable whilst an aircraft is passing with its cross-head in lowered position.

The rams must be perfectly aligned within the runway, which involves considerable foundation work, and must correctly work whatever the climatic conditions and the cleanness conditions may be. It is understood that such a system requires considerable and careful maintenance as well as the equipping of each ram with control instruments allowing to check that the crossing cable is in a correct position when an aircraft having a lowered cross-head arrives.

SUMMARY OF THE INVENTION

Consequently, in order to remove these inconveniences, the present invention provides a retractile support system of simplified construction, setting up and maintenance.

In the system of the invention, the movement of the crossing cable results from the combination of two elementary movements, i.e. a movement directed upwards and obtained by means of a member adapted to convert a drive movement into a vertical reciprocable movement, and a lateral movement obtained by rotating the support about a fixed axis, with a suitable lever arm, for avoiding the cable staying vertically above its housing provided within the runway.

All the necessary elements which act to obtain, from the drive movement, the movement of the cable support means are mechanically interconnected so as to ensure that if one of them has been moved, all the others have correspondingly been moved.

With such support system, it is possible to use a single drive member disposed at one side of the strip and connected to each one of the cable actuators. Such connection provides a traction effort with a to-and-fro movement. Moreover this system avoids the need to equip each actuator with a position control device, a single control device disposed on the drive member being sufficient.

The drive member may be autonomous, for example a fluid-operated device fed with compressed gas from a bottle or an electrical device connected to an electric power supply.

Another advantage consists in the fact that this conception permits units of small size and of simple shapes to be easily installed in the runway by machining the concrete. The usual quality of this machining is sufficient to ensure a satisfactory alinement of the actuators without the need of adjusting members and to avoid the use of new concrete which inevitably would increase the time of unavailability of the runway when setting up the device.

Finally the simplicity of this system makes possible the installing of standard flexible heating resistances in position for avoiding any blocking-up by ice.

BRIEF DESCRIPTION OF THE DRAWING

FIG. 1 is a perspective view of the unit comprising a cable disposed on a runway;

FIG. 2 is a schematic perspective view showing transforming of the driving movement into a raising and lowering movement of the cable support;

FIG. 3 is a vertical cross-section taken along a vertical plane passing through the center of an actuator, the crossing cable being in a raised position;

FIG. 4 is a vertical cross-section taken along a vertical plane passing between two successive actuators, the cable being in a retracted position;

FIG. 5 is a schematic view of the system driving the actuators from the motor unit.

DESCRIPTION OF THE PREFERRED EMBODIMENT

Figure 6:
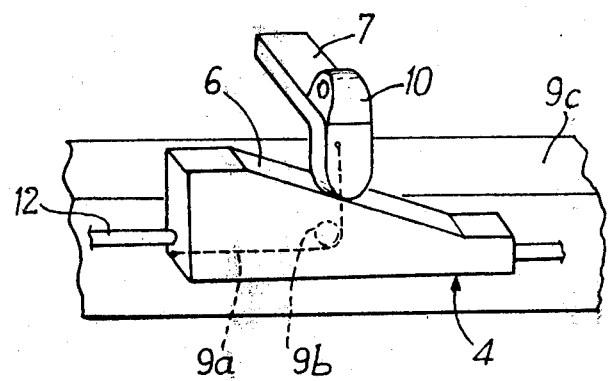
FIG. 6 shows a detail of a mechanical connection between a cam and a cable support.

In the specific form of embodiment illustrated in the drawing, the retractile system for the cable comprises, on the take-off or landing strip 1, a cable 2 connected at its ends to two brakes 3 disposed at each side of the strip and supported by a plurality (about 15 to 20) of actuators 4 moved by a drive unit 5 housed within the ground at one side of the strip 1.

Each actuator 4 consists of a cam having an inclined plane 6 on which rests a cable support 7 pivoting about an axis 8. A mechanical connection 9 (see FIG. 6) ensures a constant contact of the support 7 with the inclined plane 6. Finally the support 7 sustains the block 10 retaining the cable 2.

Referring to FIG. 6, the mechanical connection 9 shown schematically in FIGS. 2 and 3 consists of a cable 9a connected at one end to the cam and at the other end to the support 7. The cable 9a lies in a vertical plane parallel to the connecting member 12 and passes about a pulley 9b mounted in fixed position, but freely rotatable, on a support 9c.

In its low position, the crossing cable is disposed below the strip level and bears upon a channel 11.

All the actuators are secured on a connecting member 12 supported by a pair of pulleys 13 and connected to the drive unit 5.

In this form of embodiment the machining of the strip concrete is limited to forming a groove about 25 cm deep and 6 cm wide and a number of drillings of a diameter of about 160 mm corresponding to the number of brackets.

There is described hereafter the operation of the portion of the device allowing the retraction and the raising of the cable.

The system feeding the drive unit 5 as well as the electric control for its operation are not original per se and consequently are not fully explained hereafter. The electric control members are enclosed in a small cabinet (not shown) located in the vicinity of the strip and a switch board in the control tower allows to remote-control the raising and lowering of the cable as well as to check the potential condition of the device.

When the raising of the crossing cable is ordered from the control tower or from the cabinet located in the vicinity of the strip, the drive unit 5 pulls the connecting member 12 (toward the right hand side of FIGS. 2 and 5) thus carrying along the cam having the inclined planes 6 which raise and pivot supports 7. The combination of these two movements causes the cable to emerge from the strip and it is free to move away from a position above its housing provided in the strip. A stroke end contactor stops the motor feed and indicates that the cable has reached a good position. The strength of supports 7 allows without deterioration the passing thereon of an aircraft wheel.

To retract the cable into the strip, a suitable order is given from the control tower or the cabinet and the drive unit 5 pulls again the connecting member 12, but in the opposite direction, thus carrying along the cams with the inclined planes 6 to cause the supports 7 to lower under the action of the mechanical connection 9. Another stroke end contactor stops the motor feed and indicates that the cable has reached its low position.

This invention should not be construed as being limited to the specific form of embodiment shown and described herein, since various modifications and variations may be made therein without departing from the invention as defined in the appended claims.

What we claim is:

1. A retractile support unit for an arresting cable disposed across a take-off or landing strip for aircraft, comprising:
   (i) a plurality of actuators supporting said arresting cable and disposed in a channel across the strip, each actuator including a cam having an inclined plane and adapted to move in said channel parallel to the arresting cable, a cable support engaging said inclined plane and adapted to pivot about an axis parallel to the arresting cable, and a mechanical connection maintaining said cable support permanently in engagement with said inclined plane,
   (ii) a motor unit disposed at one side of the strip,
   (iii) a member connecting the cams of the actuators, said connecting member passing about a pair of pulleys and being connected to said motor unit for movement parallel to the arresting cable so as to exert a pulling action on the cam when the connection member is moved in each direction,
   movement of the connecting member in one direction causing said cable supports to be raised and pivoted such that the arresting cable emerges from the channel and is moved away from being vertically above the channel, and movement of the connecting member in the other direction causing the arresting cable to be retracted into the channel.

2. A retractile support unit, as claimed in claim 1, wherein the number of said actuators is comprised between fifteen and twenty inclusive.

3. A retractile support unit, a claimed in claim 1 or claim 2, wherein said motor unit is electrically energised.

4. A retractile support unit, as claimed in claim 1 or 2 wherein said motor unit is fed with compressed fluid.

* * * * *